Figure 2A:
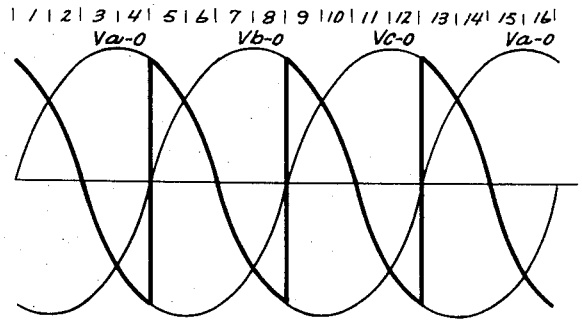

Sept. 20, 1960    H. L. KELLOGG    2,953,736
STATIC MAGNETIC FREQUENCY MULTIPLIER
Filed Nov. 20, 1957    2 Sheets-Sheet 1
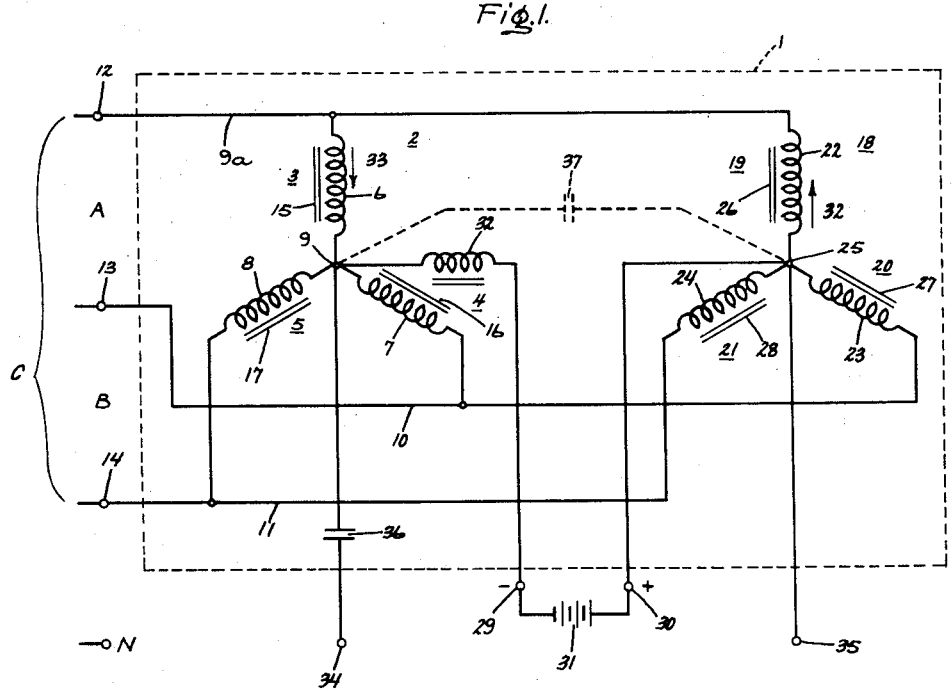
Inventor:
Harry L. Kellogg,
by Harry F. Manbeck, Jr.
His Attorney.

Sept. 20, 1960     H. L. KELLOGG     2,953,736
STATIC MAGNETIC FREQUENCY MULTIPLIER
Filed Nov. 20, 1957     2 Sheets-Sheet 2

Inventor:
Harry L. Kellogg,
by Harry F. Manbeck Jr.
His Attorney.

United States Patent Office 2,953,736
Patented Sept. 20, 1960

2,953,736
STATIC MAGNETIC FREQUENCY MULTIPLIER

Harry L. Kellogg, Fort Wayne, Ind., assignor to General Electric Company, a corporation of New York Filed Nov. 20, 1957, Ser. No. 697,722

7 Claims. (Cl. 321—7)

This invention relates to apparatus for converting the frequency of a source of alternating current from a lower to a higher value, commonly referred to as a frequency multiplier, and more particularly to frequency multipliers of the type incorporating static magnetic components.

There are many applications, such as in the operation of magnetic amplifiers, certain types of induction motors and in fluorescent lighting, where it is desirable to provide a source of alternating current having a frequency considerably higher than that generally furnished by utilities in the United States, i.e., 60 cycles per second. This higher frequency may be provided by rotating equipment, for example, an alternating current motor operating from a source of commercially available power and driving a higher frequency alternator. Rotating equipment however inherently requires appreciable maintenance, and is generally large and bulky. It is therefore desirable to provide apparatus for furnishing higher frequency alternating current power which incorporates static components. Numerous static frequency multipliers utilizing various combinations of transformers and saturable core reactors have been devised in the past. It is, for example, well known that there is developed between the neutral point of Y-connected three phase transformer windings and the neutral point of the system a third-harmonic voltage having its magnitude dependent upon the degree of saturation of the transformer core. This principle has been utilized in the so called "tripler" circuits which utilize three Y-connected biased saturable core reactors respectively connected across a source of three phase alternating power, these reactors conventionally having output windings which are respectively serially connected across the load to furnish the single phase alternating current output at three times the frequency of the input.

There are occasions when it is desirable to utilize a static magnetic frequency converter for furnishing alternating current power at a frequency still higher than three times the input frequency. Various circuits have been devised, commonly referred to as "sextuplers," which provide an output frequency six times the input frequency. However, all the "sextupler" circuits with which the applicant is familiar have been relatively complex and involved the use of a sizable number of saturable core reactors and further, separate bias and output windings were necessary on at least some of the reactors. It is therefore desirable to provide a static magnetic frequency multiplier of the type which furnishes an output frequency higher than three times the input frequency which employs fewer reactors than previous circuits and which eliminates the need for separate bias and output windings on the reactors.

It is therefore an object of this invention to provide an improved static magnetic frequency multiplier.

Another object of this invention is to provide an improved static magnetic frequency multiplier of the type furnishing an output frequency higher than three times the input frequency.

Yet another object of this invention is to provide improved static magnetic frequency multiplier having an output frequency higher than three times the input frequency and which does not require the use of separate bias and output windings on the reactors.

Further objects and advantages of this invention will become apparent by reference to the following description and the accompanying drawings and the features of novelty which characterizes this invention will be pointed out with particularity in the appended claims annexed to and forming a part of this specification.

I have discovered that if two groups of star-connected saturable core reactors are provided having their windings respectively connected across a plural phase alternating current source, for example, two groups of Y-connected saturable core reactors having their windings respectively connected across the three lines of a three phase source of alternating current power, and with the two groups of reactors being respectively biased in opposite directions, a higher order harmonic is developed across the neutral points of the two groups of reactors. For example, in the case of two groups of Y-connected reactors connected across a source of three phase alternating current power, a sixth harmonic appears across the neutral points of the two groups of reactors.

This invention in its broader aspects therefor provides two groups of star-connected saturable core reactors having their windings respectively connected across a plural phase source of alternating current power. A direct current bias voltage is impressed across the neutral points of the two groups of reactors with a choke in circuit with the bias supply and an output circuit is likewise connected to the two neutral points of the two groups of reactors.

Figure 2B:
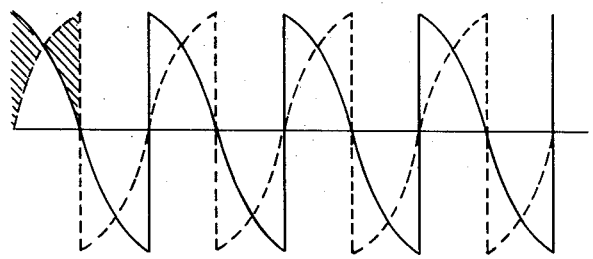
Figure 2C:
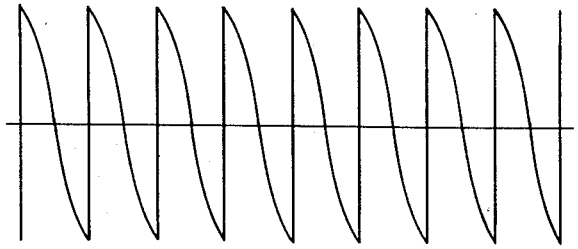
Figure 3A:
Figure 3B:
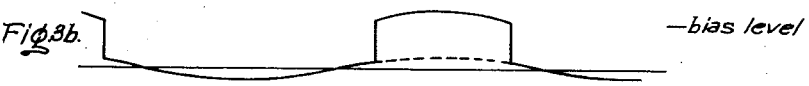
Figure 3C:
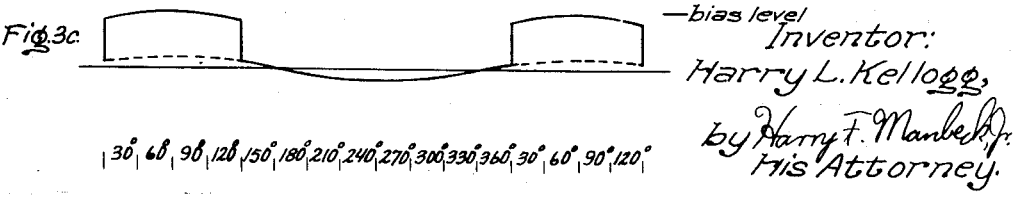

In the drawings, Fig. 1 is a schematic illustration of the improved static magnetic frequency multiplier of this invention;

Figs. 2a, 2b, and 2c illustrate voltage wave forms found in the circuit of Fig. 1; and Figs. 3a, 3b, and 3c show plots of the flow of magnetizing current through the reactors of one of the groups of the reactors of the circuit of Fig. 1 during a complete cycle of applied voltage.

Referring now to Fig. 1, my improved static magnetic frequency multiplier, generally identified as 1, is shown as being adapted for connection to a three phase source of alternating current power and therefore provides a single phase output having a frequency six times the input frequency. It will be understood however, that my invention is not limited to operation from a three phase source of power but rather may be used with other polyphase sources, it having particular advantage for use with polyphase sources having an odd number of phases. The frequency multiplier 1, includes a first group 2 of saturable core reactors, 3, 4 and 5 having their windings, 6, 7, and 8 respectively Y-connected at their inner ends to form a neutral point 9 and having their outer ends respectively connected to lines 9a, 10, and 11. Lines 9a, 10, and 11 are respectively adapted to be connected to a suitable external source of three phase alternating current power (not shown). The cores, 15, 16, and 17 of the saturable core reactors, 3, 4, and 5 respectively, are preferably formed of suitable sharply saturating magnetic material.

A second group 18 of saturable core reactors, 19, 20, and 21 is provided with their windings 22, 23, and 24, similarly having their inner ends Y-connected to form neutral point 25 and their outer ends respectively connected to lines 9a, 10, and 11. The cores, 26, 27, and 28 of the saturable core reactors, 19, 20, and 21 respectively, are likewise formed of suitable sharply saturating magnetic material.

In order to provide a direct current bias for the two groups, 2 and 18 of saturable core reactors, a pair of bias terminals 29 and 30 are provided to which may be connected a suitable source of direct current power, such as battery 31. Terminal 30 is directly connected to neutral point 25 of the second group 18, of saturable core reactors while a suitable choke 32 serially connects neutral point 9 of the first group 2, of saturable core reactors and the other direct current bias terminal 29. It will thus be readily seen, assuming that terminal 30 is positive, that the bias current will flow through winding 22 of reactor 19 in the direction shown by the arrow 32 and will flow in winding 6 of saturable core reactor 3 in the direction shown by the arrow 33. The bias current will likewise flow in the other windings of the two of reactor groups in the same relative direction. It is thus seen that the saturable core reactors 3, 4, and 5 of the first group 2 will be biased in one direction while the reactors 19, 20, and 21 of the second group, 18 will be biased in the opposite direction. It is thus seen that bias current is provided for the saturable core reactors of the frequency multiplier 1 without requiring the use of separate bias windings on the reactor cores.

As indicated here and above, I have discovered that with the above described connection and with the two groups of oppositely biased, Y-connected saturable core reactors respectively connected to a three phase source of power, a sixth harmonic voltage appears across the neutrals of the two groups of reactors. Accordingly, in order to utilize this sixth harmonic voltage, a pair of output terminals 34 and 35 are provided respectively connected to neutral points 9 and 25 of the two groups of saturable core reactors, 2 and 18, a suitable blocking capacitor, 36 being serially connected between output terminal 34 and neutral point 9 in order to prevent the flow of direct current through the load from battery supply 31.

As indicated previously, this invention is not limited to a "sextupler" circuit operable from a source of three phase alternating current and providing a single phase output having a frequency six times the input. If it is desired to utilize this invention in connection with, for example, a source of five phase alternating current, it is merely necessary to provide two groups of star-connected saturable core reactors, each group having five saturable core reactors with their windings star-connected across the five phase source of power, with the bias supply again connected between the two neutrals and the output likewise connected across the two neutrals of the two groups of saturable core reactors.

A suitable capacitor of 37, as shown in dotted lines in Fig. 1, may optionally be connected between the two neutral points 9 and 25 for the reason to be hereinafter described.

For an explanation of the mode of operation of the circuit of Fig. 1, reference will now be had to Figs. 2 and 3. For simplicity, the phase of the input voltage appearing across the input terminals 12 and 13 will be referred to as phase "A," the phase appearing across the terminals 13 and 14 will be referred to as phase "B" and the phase appearing across terminals 14 and 12 will be referred to as phase "C." In Fig. 2a, there is shown the phase voltages of the three phase source, i.e., the voltage of each phase to the source neutral, these voltages being identified as V$a$–$o$, V$b$–$o$, and V$c$–$o$. Assuming (which is not actually the case) that all of the saturable core reactors of both groups remain unsaturated during an entire cycle of applied voltage, the voltage waves of Fig. 2a will be those appearing across the respective saturable core reactors, for example, V$a$–$o$ would be the voltage appearing across winding 6 of saturable core reactor 3, V$b$–$o$ would be the voltage appearing across winding 7 of saturable core reactor 4 and V$c$–$o$ would be the voltage appearing across winding 8 of saturable core reactor 5.

It will be recalled that it is a characteristic of sharply saturating saturable core reactors that they display very high impedance when their cores are unsaturated and very low impedance when their cores are saturated. It will therefore be readily seen that in the two groups, 2 and 18, of saturable core reactors, only one of the saturable core reactors in each group may be in its saturated condition at any given time since it is necessary that the two remaining reactors have high impedance in order to prevent their appearing essentially as a short circuit across one of the phases. Referring now to Fig. 2a and considering the first group of the saturable core reactors, 2, it will be assumed that at the beginning of interval 1, reactor 5 is saturated and its winding 8 therefore has very low impedance. Under this condition, the neutral point 9 will be essentially at the same potential as line 11. The potential of the neutral point 9 throughout the cycle is shown in heavy lines on Fig. 2a and thus it is seen during the period of saturation of reactor 5, neutral point 9 is at a potential corresponding to the voltage of V$c$–$o$. After the first 120 degrees of applied voltage and for a reason which will be explained in connection with Figs. 3a, 3b and 3c, reactor 5 will become unsaturated and reactor 3 becomes saturated. The potential of neutral point 9 to the system neutral therefore suddenly becomes essentially the same as the potential of line 9a and it therefore follows the voltage curve V$a$–$o$. After the next 120 degrees of applied voltage, reactor 3 becomes unsaturated and reactor 4 becomes saturated therefore causing neutral point 9 suddenly to become at essentially the same potential as line 10 and to follow the curve V$b$–$o$. It is thus seen the potential of neutral point 9 with reference to the neutral of the system, shown as N in Fig. 1, has a saw-toothed configuration with a frequency three times the frequency of the applied voltage. It will also be seen each of the cores, 3, 4, and 5 can only be saturated during 120 degrees of a cycle of applied voltage and that they successively go into and out of saturation to provide the triple frequency appearing between the neutral point of the Y-connection and the system neutral.

The direction and phase-angle of the saw-toothed wave form of Fig. 2a depends upon the direction of the bias of the saturable cores. It will be recalled that the first group of saturable reactors, 2, is biased in the opposite direction from the second group 18. Thus, referring to Fig. 2b, the potential between the neutral point 9 and the system neutral N follows the same curve as that shown in Fig. 2a, as shown in solid lines in Fig. 2b and the potential between the neutral point 25 of the second group of saturable core reactors 18 and the system neutral N is as shown in the dashed lines of Fig. 2b. It will now be readily seen that by connecting the output terminals 34 and 35 respectively to the two neutral points 9 and 25, the potential across the output terminals is in fact the difference between the potential of neutral point 9 and that of neutral point 25. Thus, and still referring to Fig. 2b, during the first interval, the potential across terminals 34 and 35 will be that indicated in the shaded area between the solid-line curve and the dashed-line curve which may be assumed to be in the positive direction and in the second interval, the solid and dashed lines of Fig. 2b, now having reversed their relative positions, the potential across the output terminals 34 and 35 again is the difference represented by the shaded area and has a negative polarity. Fig. 2c shows the resultant output voltage wave form appearing across neutral points 9 and 25 and output terminals 34 and 35, it being clearly seen that the output voltage is the difference between the voltages appearing at neutral points 9 and 25 and that it has six times the frequency of the input source of power.

Referring now to Fig. 3, 3a shows a plot of the magnetizing current of reactor 3, Fig. 3b shows a plot of the magnetizing current of reactor 4 and Fig. 3c shows a plot of the magnetizing current of reactor 5. In each case, the actual magnetizing current is shown in solid lines and the magnetizing current which would flow through the respective windings of the reactors if no bias current were flowing therein is shown in the dashed lines. It must now be remembered that reactors of the type under consideration in their unsaturated condition have very high impedance and thus very low magnetizing current. It must further be recalled that the choke 32 tends to keep currnet flowing in the same direction in the bias circuit after such current flow would normally cease or reverse. This bias current when flowing in the reactor windings is sufficient to saturate the reactor cores. Therefore, one of the saturable core reactors must always be saturated since bias current must flow in one of the reactor windings at any given time.

Referring now to Fig. 3c, and specifically to the intervals 1 through 4, it will be assumed that reactor 5 is at that time saturated; reactors 3 and 4 therefore cannot be saturated, otherwise they would form a low impedance across the A.-C. supply and the resultant current would cause them to become unsaturated. It now should be further recalled that the current flowing in any one phase of the Y-connected group of saturable core reactors must be the algebraic sum of the bias current and the other two phase currents. It will be further recalled that since the circuit comprising the three Y-connected saturable core reactors is substantially inductive, the magnetizing current which would normally flow if the reactors were not biased would lag the applied voltage by 90 degrees. For the same reason, the fundamental component of actual magnetizing current must also lag the applied voltage by essentially 90°. It is thus seen that the actual magnetizing current flowing in winding 8 of reactor 5 beginning at interval 1, as shown in Fig. 3c, since it is lagging, is positive and essentially equal to the direct current bias. Reactor 5 is saturated thus having low impedance and tends to draw very high current. As was pointed out, this current is limited to the algebraic sum of the bias current plus the magnetizing currents of reactors 3 and 4, which, being unsaturated during this interval, have high impedance and low magnetizing current. It will now be recalled that during a cycle of applied voltage with steady-state conditions, the volt-seconds induced in any given reactor must average out to zero.

If reactor 3 were connected across a source of single phase alternating current, it could be made to saturate at 120° of the applied voltage by suitable design of the reactor to provide the necessary volt-second characteristic. However, when the three reactors 3, 4, and 5 with D.-C. bias are Y-connected across a source of three phase alternating current power, it is found that the 120° point of applied voltage is the only point at which the reactor can go into saturation, remain saturated for 120°, and have the volt-seconds induced over the remaining 240° average out to zero. Referring to Fig. 3, reactor 3 saturates at the 120° point, thereby having very low impedance, the current tends to rise rapidly, it being again recalled that the current flowing in winding 6 of reactor 3 is limited to the algebraic sum of the bias current plus the magnetizing currents of reactors 4 and 5. This sudden increase in current in reactor 3 causes reactor 5 to go out of saturation and its magnetizing current to become very small. Reactor 3 thus stays saturated and its magnetizing current continues at a level essentially equal to the bias current for the next 120 degrees at which point reactor 4 goes into saturation, and its magnetizing current suddenly increases positively as shown in Fig. 3b. This causes the current in reactor 3 to become very small thus causing reactor 3 to become unsaturated. Reactor 4 remains saturated for 120 degrees with its current at essentially the bias level and the currents in reactors 3 and 5 at the unsaturated level for the next 120 degrees at which point reactor 8 again becomes saturated and reactor 4 becomes unsaturated to complete the cycle.

A circuit in accordance with Fig. 1 has been constructed for operation from a three phase source of 60 cycle, 230 volts power. Each of the reactors 3, 4 and 5, and 19, 20 and 21 had a rectangular core formed of sharply saturating magnetic material, i.e., having a substantially rectangular dynamic hysteresis loop. These cores had a stack height of 1.125 inches, a length of 8.0 inches, a width of 3.25 inches and had a winding window 1.25 inches wide and 4.0 inches long. The windings of these reactors were respectively formed of 416 turns of .043 inch diameter wire. The bias voltage supply 31 provided a bias current of 10 amperes. Reactor 32 had an inductance of 0.9 henries and capacitor 36 had 28 microfarads. With this arrangement, the output voltage across output terminals 34—35 was found to be 35.5 volts at 360 cycles, i.e., six times the input frequency of 60 cycles. In this case, the value of the capacitor 36 was chosen in order to give maximum output so that its capacitive reactance at 360 cycles would be equal to the inductive reactance of the saturable core reactors when in their saturated condition. The circuit was also tested utilizing a parallel connected capacitor 37 in addition to the blocking capacitor 36 in which case the capacitor 37 had a value of 24.5 microfarads in order to resonate with the saturable core reactors when in their saturated condition at the frequency of the output voltage while capacitor 36 had a value of 16 microfarads which with this circuit connection was found not to be critical.

It will now be seen that I have provided an improved frequency multiplying circuit which furnishes output power at a frequency higher than three times the input frequency and which utilizes many less reactors than previous circuits providing comparable frequency output, and which further eliminates all separate bias and output windings from the reactors.

While I have shown and described a particular embodiment of this invention, further modification and improvements will occur to those skilled in the art. I desire that it be understood therefore that this invention is not limited to the particular form shown and I intend in the appended claims to cover all modifications which do not depart from the spirit and scope of this invention.

What I claim as new and desire to secure by Letters Patent of the United States is:

1. A static magnetic frequency multiplier comprising: a plurality of alternating current input terminals adapted to be connected to a polyphase source of alternating current; first and second groups of star-connected saturable core reactors having their windings respectively connected to said input terminals; a direct current bias circuit connected to impress a direct current bias voltage across the neutral points of said first and second groups of reactors thereby providing a direct current bias in one direction for one of said group of reactors and in the opposite direction for the other group; a choke connected in said bias circuit; and a single phase load circuit having its sides respectively connected to said neutral points.

2. A static magnetic frequency multiplier comprising: a plurality of alternating current input terminals adapted to be connected to a polyphase source of alternating current; first and second groups of star-connected saturable core reactors having their windings respectively connected to said input terminals; a direct current bias circuit connected to impress a direct current bias voltage across the neutral points of said first and second groups of reactors thereby providing a direct current bias in one direction for one of said groups of reactors and in the opposite direction for the other group; a choke connected in said bias circuit; a single phase load circuit having its sides respectively connected to said neutral points; and a direct current blocking capacitor connected in series in said load circuit for preventing the flow of direct current therein.

3. A static magnetic frequency multiplier comprising: a plurality of alternating current input terminals adapted to be connected to a polyphase source of alternating current; first and second groups of star-connected saturable core reactors having their windings respectively connected to said input terminals; a direct current bias circuit connected to impress a direct current bias voltage across the neutral points of said first and second groups of reactors thereby providing a direct current bias in one direction for one of said groups of reactors and in the opposite direction for the other group; a choke connected in said bias circuit; a single phase load circuit having its side respectively connected to said neutral points; and a capacitor connected between said neutral points and proportioned to resonate with the reactors of said first and second groups when in their saturated condition at the frequency of the voltage across said load circuit.

4. A static magnetic frequency multiplier comprising: a plurality of alternating current input terminals adapted to be connected to a polyphase source of alternating current; first and second groups of star-connected saturable core reactors having their windings respectively connected to said input terminals; a direct current bias circuit connected to impress a direct current bias voltage across the neutral points of said first and second groups of reactors thereby providing a direct current bias in one direction for one of said groups of reactors and in the opposite direction for the other group; a choke connected in said bias circuit; a single phase load circuit having its sides respectively connected to said neutral points; a direct current blocking capacitor connected in series in said load circuit for preventing the flow of direct current therein and proportioned to resonate with the reactors of said first and second groups when in their saturated condition at the frequency of the voltage across said load circuit.

5. A static magnetic frequency multiplier comprising: a plurality of alternating current input terminals adapted to be connected to a polyphase source of alternating current; first and second groups of star-connected saturable core reactors having their windings respectively connected to said input terminals; a pair of direct current bias terminals adapted to be connected to a source of direct current bias voltage; a choke serially connecting the neutral point of one of said first groups of reactors and one of said bias terminals, the other of said bias terminals being connected to the neutral point of one of said second groups of reactors thereby providing a direct current bias in one direction for one of said reactor groups and in the opposite direction for the other group; a pair of output terminals adapted to be connected to a single phase load, one of said output terminals being connected to the neutral point of one of said first groups of reactors and the other of said output terminals being connected to the neutral point of one of said second groups of reactors; and a direct current blocking capacitor serially connecting the other of said neutral points.

6. A static magnetic frequency multiplier for converting a polyphase alternating current supply of a given frequency to a single phase alternating current having a frequency six times said given frequency, said multiplier comprising: a plurality of alternating current input terminals adapted to be connected to a polyphase source of alternating current; a first group of star-connected saturable core reactors having their windings respectively connected to said terminals; a second group of star-connected saturable core reactors having their windings respectively connected to said input terminals; circuit connections for providing a direct current bias in one direction for said first group of reactors and in the opposite direction for said second group of reactors; a choke connected in said bias circuit; and a single phase load circuit connected respectively to the neutral points of said first and said second groups of reactors.

7. A static magnetic frequency multiplier comprising: a plurality of alternating current input terminals adapted to be connected to a polyphase source of alternating current; a pair of single phase output terminals; two groups of star-connected saturable core reactors having their windings respectively connected to said input terminals and their neutral points connected in circuit with said pair of single phase output terminals; a direct current source connected in circuit with said neutral points to impress a voltage on one of said groups of saturable core reactors and an oppositely biased voltage of the other of said groups of saturable core reactors; and an inductive reactance means connected in circuit with said direct current source.

References Cited in the file of this patent
UNITED STATES PATENTS 2,683,854    Conrath _____ July 13, 1954
2,820,942    Depenbrock _____ Jan. 21, 1958